(12) United States Patent
Van De Poel

(10) Patent No.: US 9,049,240 B2
(45) Date of Patent: Jun. 2, 2015

(54) DEVICE AND METHOD FOR SHARING FILES

(75) Inventor: Dirk Van De Poel, Aartselaar (BE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 12/736,527

(22) PCT Filed: Apr. 9, 2009

(86) PCT No.: PCT/EP2009/002635
§ 371 (c)(1),
(2), (4) Date: Nov. 13, 2010

(87) PCT Pub. No.: WO2009/127358
PCT Pub. Date: Oct. 22, 2009

(65) Prior Publication Data
US 2011/0060777 A1 Mar. 10, 2011

(30) Foreign Application Priority Data
Apr. 16, 2008 (EP) ..................................... 08447024

(51) Int. Cl.
*G06F 7/00* (2006.01)
*G06F 17/30* (2006.01)
*H04L 29/08* (2006.01)

(52) U.S. Cl.
CPC .......... *H04L 67/24* (2013.01); *G06F 17/30206* (2013.01); *G06F 17/30772* (2013.01); *H04L 67/2842* (2013.01)

(58) Field of Classification Search
CPC .................... G06F 17/30206; G06F 17/30772; G06F 17/30091; G06F 17/30115; G06F 17/30283; G06F 3/00; H04L 67/24; H04L 67/2842; H04L 29/06; H04L 65/1036; H04L 67/04; H04L 67/10; H04L 65/1026; H04L 29/06027; H04L 67/289; H04H 60/88; H04N 21/4126
See application file for complete search history.

(56) References Cited

U.S. PATENT DOCUMENTS 5,838,916 A * 11/1998 Domenikos et al. .......... 709/219
5,841,304 A * 11/1998 Tam .............................. 327/161
(Continued)

FOREIGN PATENT DOCUMENTS

JP 2006221438 8/2006
JP 2006227843 8/2006
(Continued)

OTHER PUBLICATIONS

Searh Rept: Jun. 2, 2009.

*Primary Examiner* — Daniel Kuddus
(74) *Attorney, Agent, or Firm* — Jack Schwartz and Associates, PLLC

(57) ABSTRACT

The present invention concerns a method at a network device, the device comprising a first interface to a first network, a second interface to a second network, and routing means, for enabling access to a file shared by a first device located on the first network, the network device having detected the presence of the first device on the first network, the first device comprising at least one shared file. The method comprises the step, at the network device, of detecting that the first device is not accessible, on reception of a request from a second device located on the second network for getting a shared file on the first device, storing the request, on detection that the first device is accessible, retrieving the shared file in a memory of the network device, and sending a notification to the second device that the shared file is available at the network device or sending the file to the second device.

6 Claims, 4 Drawing Sheets

(56) References Cited

U.S. PATENT DOCUMENTS

| | | | |
|---|---|---|---|
| 6,003,065 A * | 12/1999 | Yan et al. | 709/201 |
| 6,008,907 A * | 12/1999 | Vigneau et al. | 358/1.9 |
| 6,043,519 A * | 3/2000 | Shealy et al. | 257/195 |
| 6,063,655 A * | 5/2000 | Shealy et al. | 438/170 |
| 6,072,901 A * | 6/2000 | Balonon-Rosen et al. | 382/167 |
| 6,088,038 A * | 7/2000 | Edge et al. | 345/600 |
| 6,088,803 A * | 7/2000 | Tso et al. | 726/22 |
| 6,111,268 A * | 8/2000 | Mannhart et al. | 257/31 |
| 6,128,022 A * | 10/2000 | Dillinger | 345/591 |
| 6,151,684 A * | 11/2000 | Alexander et al. | 714/4.21 |
| 6,154,787 A * | 11/2000 | Urevig et al. | 710/8 |
| 6,160,644 A * | 12/2000 | Lin | 358/518 |
| 6,181,445 B1 * | 1/2001 | Lin et al. | 358/520 |
| 6,317,594 B1 * | 11/2001 | Gossman et al. | 455/414.1 |
| 6,718,361 B1 * | 4/2004 | Basani et al. | 709/201 |
| 7,483,958 B1 * | 1/2009 | Elabbady et al. | 709/217 |
| 7,640,248 B2 | 12/2009 | Nakamura | |
| 7,966,086 B2 | 6/2011 | Yoneda et al. | |
| 2002/0078161 A1 * | 6/2002 | Cheng | 709/208 |
| 2002/0174269 A1 * | 11/2002 | Spurgat et al. | 710/1 |
| 2003/0004933 A1 | 1/2003 | Ben-Yehezkel | |
| 2004/0143836 A1 * | 7/2004 | McCormack et al. | 719/316 |
| 2008/0256183 A1 * | 10/2008 | Flynn et al. | 709/204 |

FOREIGN PATENT DOCUMENTS

| | | |
|---|---|---|
| JP | 2008022509 | 1/2008 |
| WO | WO03/012578 | 2/2003 |
| WO | WO2004/068469 | 8/2004 |
| WO | WO2005/091161 | 9/2005 |
| WO | WO2007/033363 | 3/2007 |
| WO | WO2008011549 | 1/2008 |

* cited by examiner

OFFICE NETWORK

• Wireless

├── WLAN: SpeedTouchS8ADA4 (54Mbps)

• Ethernet

├── Ethport1 (100Mbps) —— Unknown 00-0d-88-30-c8-f3
    ├── Ethport2 (100Mbps) ——
    ├── Ethport3 (100Mbps) ——
    └── Ethport4 (100Mbps) ——

FIG. 4

LOCAL NETWORK DEVICES

• Detected device(s)

| Name | IP address | Interface |
|---|---|---|
| SpeedTouch 620 | 0.0.0.0 | |
| Unknown 00-0d-88-30-c8-f3 | 10.0.0.10 | Ethport1 |

DEVICE AND METHOD FOR SHARING FILES

This application claims the benefit, under 35 U.S.C. §365 of International Application PCT/EP2009/002635, filed Apr. 9, 2009, which was published in accordance with PCT Article 21(2) on Oct. 22, 2009 in English and which claims the benefit of European patent application No. 08447024.4, filed on Apr. 16, 2008.

FIELD OF THE INVENTION

The present invention relates generally to file sharing and in particular to a device and a method at the device for enabling a device located on a local device to share files with a device located on the Internet.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

An Internet Gateway usually comprises a graphical user interface (GUI) and an HTTP server that enables any user to connect from the Internet to the Gateway embedded GUI, typically by means of a HTTP server serving HTML pages.

A Gateway may also embed functionality that is able to discover files shared on the local network. The files shared on the local network can be listed on a GUI (HTML page) so that an end-user from the LAN or WAN can browse through the list of shared files, download and upload files from and to local network devices. This functionality allows a user from anywhere on the Internet to download/upload files from local network PCs or devices. Examples are displaying pictures from a friend's place, accessing particular data from abroad, storing important mail attachments on a home device. Of course, the end-user accesses the GUI through a local or a remote device.

Local network devices are usually mobile/portable devices such as media players, gaming devices, laptop computers, PDA. They are regularly powered off and/or not connected to the gateway. Access from the Internet to files that are stored and shared on those devices is then not possible. Anyone wanting to access these files from the Internet either needs to verify upfront whether the local network device is powered on, or just make attempts.

SUMMARY OF THE INVENTION

The present invention attempts to remedy at least some of the concerns connected with the access to the files on local devices, by providing a method at the gateway for managing file access when a local device is not accessible.

The present invention concerns a method at a network device, the device comprising a first interface to a first network, a second interface to a second network, and routing means, for enabling access to a file shared by a first device located on the first network, the network device having detected the presence of the first device on the first network, the first device comprising at least one shared file.

The method comprises the steps, at the network device, of detecting that the first device is not accessible, on reception of a request from a second device located on the second network for getting a shared file on the first device, storing the request, on detection that the first device is accessible, retrieving the shared file in a memory of the network device, and sending a notification to the second device that the shared file is available at the network device or sending the file to the second device.

According to an embodiment, the method comprises the step of, once the file has been retrieved by the second device or sent to the second device, removing the file from the memory.

According to an embodiment, the method comprises the step of removing the file from the memory after a delay.

According to an embodiment, the network device comprises a graphical user interface for indicating the first device and the shared file.

The present invention also concerns a method at a network device, the device comprising a first interface to a first network, a second interface to a second network, and routing means, for enabling access to a file shared by a first device located on the first network, the network device having detected the presence of the first device on the first network, the first device comprising at least one shared file. The method comprises the step, at the network device, of detecting that the first device is not accessible, on reception of a request from a second device for getting a shared file on the first device that is not accessible, storing the request, and on detection that the first device is accessible, sending a notification to the second device that the file is available at the first device.

The present invention also concerns a method at a network device, the device comprising a first interface to a first network, a second interface to a second network, and routing means, for enabling access to a file shared by a first device located on the first network, the network device having detected the presence of the first device on the first network, the first device comprising at least one shared file. The method comprises the step, at the network device, of detecting that the first device is not accessible, on reception of a file from a second device located on the second network to the first device, storing the file, and on detection that the first device is accessible, sending the file to the first device.

According to an embodiment, the file is a new version of the shared file.

According to an embodiment, the method comprises the step of sending an indication to the second device that the file has been sent to the first device.

The present invention also concerns a network device comprising a first interface to a first network, and a second interface to a second network, routing means, device detecting means for detecting the presence of a first device on the first network, file detecting means for detecting a shared file on the first device, file sharing means for managing access to the shared file by a second device located on the second network, when the first device is not accessible.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

FIG. 4 represents a graphical user interface compliant with the embodiment; and

FIG. 5 also represents a graphical user interface compliant with the embodiment.

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of a gateway interconnecting a remote device to a local device, but the invention is not limited to this particular environment and may be applied within other frameworks where a first device is temporarily connected to a second device, and where the second device is always accessible to a remote device. The invention is then applicable to a second device that may temporarily connect to a first device comprising storing means and file sharing means. In particular, the second device might be a cellular device or a laptop, and the first device an external memory.

Figure 1:
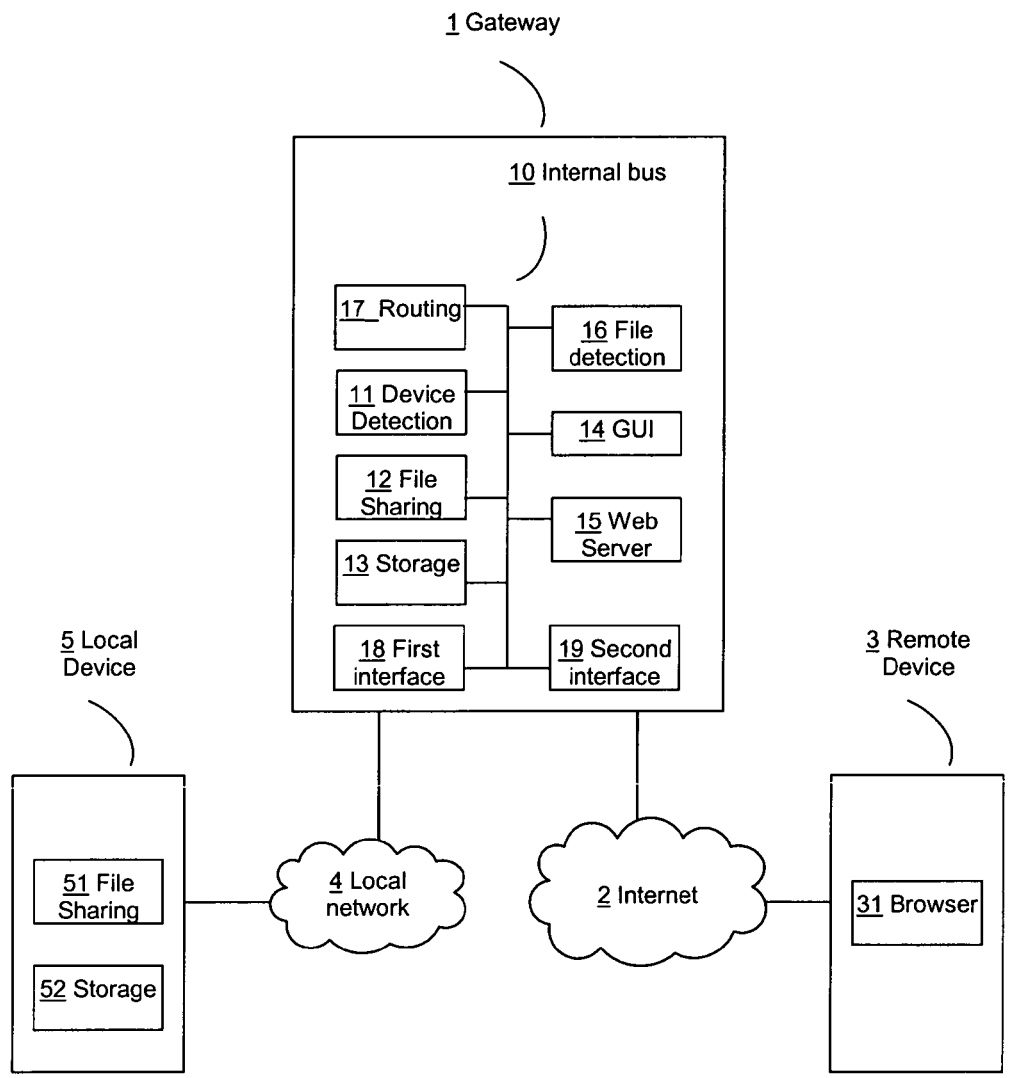
FIG. 1 is a block diagram of an object and a system compliant with the embodiment.

The system according to the embodiment is described in FIG. 1. A gateway 1 comprises a first interface (18) for connecting to a first network that is a local area network LAN 4. It comprises a second interface (19) for connecting to a second network that is an Internet network 2. The gateway comprises a router (17). Of course the gateway device might be any type of device that comprises means for connecting to a first network and to a second network. This gateway could be a broadband router, a wireless router or a DSL modem with router or any network device with IP router functionality. More generally the gateway could be any device comprising interfacing means and routing means. The router functionality is intended to allow the network device to be reachable from the Internet.

The first and the second networks might also be the same type of network. The second network might be a LAN type, and further the same LAN as the first network. The first and the second networks might also be the Internet network.

The means for connecting are those well known to the skilled in the art, and are not represented in FIG. 1.

A local device 5 is connected to the LAN 4. According to the embodiment, the local device is a laptop. Of course it might be any type of device that comprises means for connecting to the LAN 4, such as a USB key memory or a hard disk. In particular, the local device according to the embodiment comprises a storage module 52 for storing files that can be shared with other devices of the network. These may be any type of files that can be shared. The storing module is a hard disk. Of course it can be any type of storage known to the skilled in the art such as a flash memory.

The local device also comprises a file sharing module 51 that is adapted to manage the file sharing. The file sharing module enables the end-user of the local device to select the files that are shared and the files that are not shared. A shared file can be accessed by another device of the network. It may be accessed by any other device, or only by the devices that have been authorized to access shared files of the local device.

The local device is connected to the gateway through an Ethernet connection. Of course the local device might also be connected to the gateway with any other wired interface such as Ethernet, USB or IEEE1394, or any wireless interface such as Wi-Fi.

Only one local device is represented. Of course the system could comprise more than one local device that shares files.

The system according to the embodiment comprises a remote device 3 connected to the Internet 2. The remote device can communicate to the gateway, and then to the local device through the gateway. In particular the remote device comprises an HTTP web browser 31 for connecting to a web server. Here, it enables the remote device to connect to the gateway web server 15 and access its graphical user interface GUI 14. Only one remote device is represented, of course more than one remote device can connect to the gateway.

The gateway 1 comprises a web server 15 to enable the local device and the remote device to access the GUI 14. The web server is an HTTP web server hosting the gateway GUI both for devices on the LAN and devices connecting via the Internet. The GUI enables to perform gateway configuration. It has specific GUI elements dedicated for allowing retrieval files from and sending files to the gateway, from a device connecting via the Internet, as described hereinafter.

The GUI supports shared files list that indicates the list of files available on the local network. It is presented as if the files were available on the gateway. Clicking the file on the GUI initiates the retrieval of the file from a local network device.

The gateway comprises a device detection module 11, adapted to detect the presence of devices on the LAN. It collects information on LAN devices, such as IP address, hardware address or UPnP information. The gateway comprises a file detection module 16 that is adapted to collect the list of shared files on each detected device. It saves this information persistently on the storage module 13. The storage module 13 is either embedded in the gateway or externally connected to the gateway, through for example an USB hard disk. The gateway also comprises a file sharing module 12 that is adapted to manage the shared files at the gateway. In particular it manages the access to the shared files by remote devices, as indicated hereinafter. The file sharing module manages the display of information related to shared files on the GUI. It also manages the requests from the remote devices to the shared files.

All the modules of the gateway are connected with an internal bus 10. The gateway also comprises processing means not represented, and all means well known to the skilled in the art for performing the generic gateway functionalities.

Figure 2:
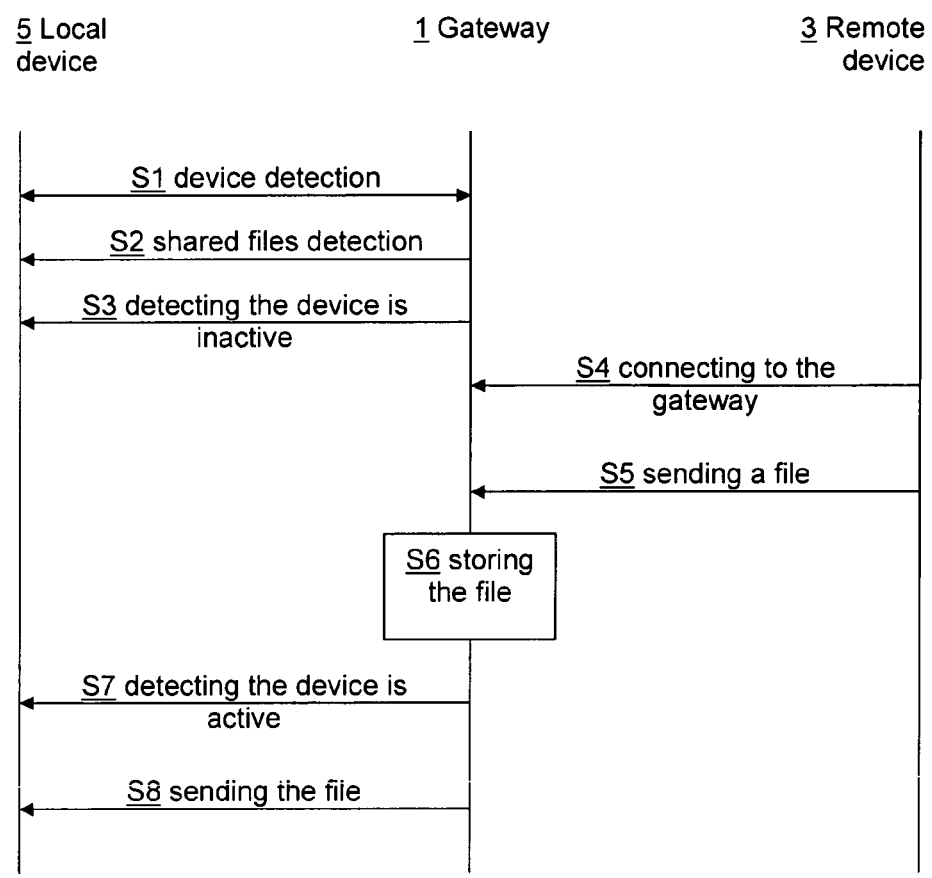
FIG. 2 is flow chart of a first method compliant with the embodiment.

The methods of the embodiment are now described. The first method is represented in FIG. 2.

At step S1, a local device supporting file sharing is connected to the gateway. The presence of this device is detected by the gateway device detection module. The gateway retrieves information on the local device, such as its IP and hardware addresses using ARP, the device vendor values via DHCP, device UPnP capabilities via UPnP advertisements. The detected local device is then indicated in the GUI, with the retrieved information.

At step S2, the file detection module of the gateway probes the local device to know whether it shares files. It retrieves the list of all the shared files on the local device; in particular, it gets the list of directories and filenames. It uses Samba protocol to perform files retrieving. Samba protocol permits a device to retrieve the list of files and directories of shared files on another device. Of course files might be retrieved with any protocols well known to the skilled in the art. For each file a number of files attributes are retrieved such as the file size and creation date. The list of shared files is stored persistently on the gateway storage. The list is retrieved on the first device detection. It is also retrieved periodically with a configurable period and possibly upon user request via a refresh button/action on the graphical user interface.

At step S3, the gateway detects that a local device is no longer active. This is done by the device detection module. It is performed with various manners well known to the skilled in the art:
- active probing to check whether the local device responds;
- expiration of the DHCP server IP address lease; or
- loss of interface connectivity on which the device is connected.

The active status of the local device is then indicated in the GUI. It permits a remote device to know whether the local device is active or not. It also permits the remote device to know whether a file is cached on the gateway, or present in the device. The remote device sees a file on the GUI that belongs to a local device. If the local device is inactive, the file may be cached on the gateway. If the local device is active, the file is present on the local device.

At step S4, a remote device connects to the gateway. It checks the list of devices on the local network, and the list of files shared per device. It checks on the GUI the device file sharing detail page that comprises the list of all files shared by each device together with the capability to send a file to that device.

At step S5, the remote device sends a file to the local device. The file is an update of a file shared by the local network device. It may also be a new file sent to the local network device. As the local device is not active, the file is stored in the gateway storage, step S6. The gateway also stores the address of the local device to which the file is addressed. The remote device is indicated that the file is stored in the gateway and distributed later to the inactive local device. This is indicated in the GUI, the file appearing in the local device directory with a specific display. Of course this might also be indicated to the remote device with a specific notification message.

At step S7, the gateway detects that the local device has become active. The gateway verifies whether there is any file on the gateway storage that needs to be sent to the device. If there are such files, these are sent to the device, possibly replacing an existing/older version of the file. Of course that file is not necessarily shared. If it is a shared file, it appears as such in the GUI. If it is not a shared file, it does not appear then in the GUI.

The gateway may then send an indication to the remote device that the file has been sent to the local device.

Of course, the step 7 is performed every time a local device becomes active again.

Figure 3:
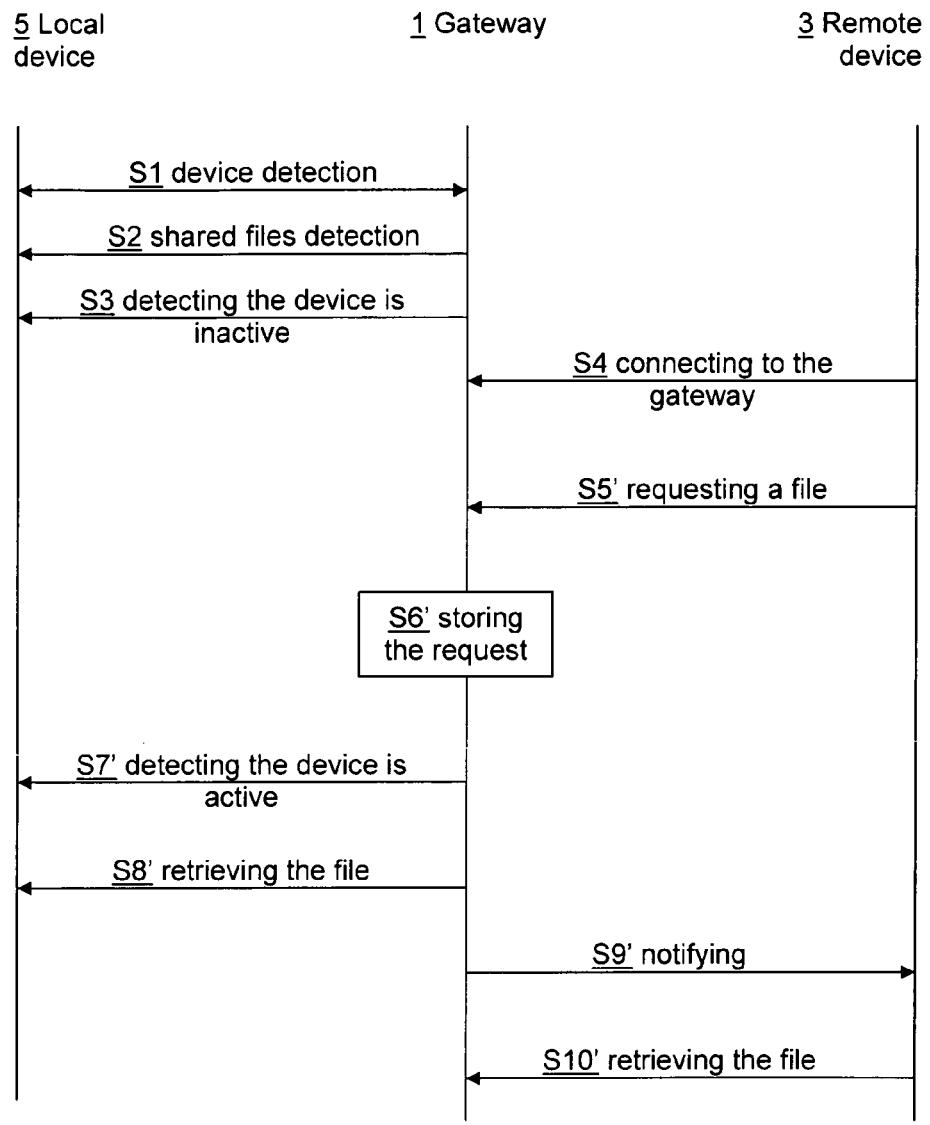
FIG. 3 is flow chart of a second method compliant with the embodiment.

The second method of the embodiment is represented in FIG. 3. The steps S1 to S4 are similar to the one of the first method.

At step S5', the remote device sends a request for getting a file on a local device. The request here is an action by an end-user on the gateway GUI which expresses the intention to retrieve a file from the local device. Of course, as indicated hereinabove, the GUI indicates that the local device is active or not. As the local device is not active, the gateway stores the request, step S6'. The GUI displays an indication that a particular file on a particular non-active device is requested but currently not available. This is under the form of, but not limited to, an extra icon or an indication next to the file in the device and shared file list.

At step S7', the gateway detects that the local device becomes active. At step S8', the gateway retrieves the file from the device and stores it temporarily on the gateway storage. This is to make sure it is available to the requesting party, regardless of whether the local device will be active or not.

At step S9', once the requested file is available on gateway storage, the user is notified via email. Of course it could be notified via any other well known notification such as SMS or instant messaging.

At step S10', the file is retrieved by the remote device, and it is removed from the gateway storage.

The file retrieved from the local device might be stored in the gateway only for a limited period. If the file is not retrieved by the remote device during that period, it is removed from the gateway device. The period is configurable, and may take values from a few minutes to several days.

If more than one remote device requested the file, the availability of the file is notified to all those remote devices. The file is removed from the memory when it has been retrieved by all the remote devices, or after the limited period.

Alternatively, the gateway does not retrieve and store the file; it does not perform the step S8'. The gateway only notifies the remote device that the file is available at the local device, and let the remote device retrieving the file from the local device. This alternative may be used if the gateway does not have enough memory to temporarily store the file.

In any case, each time the gateway detects that a device becomes active on the local network, it verifies whether there are any files on the gateway storage that need to be sent to the device by the file sharing module. If there are such files, these are sent to the device. The gateway also verifies whether there are any outstanding/open file requests for files shared by the device. If this is the case, the files are retrieved and temporarily stored on the gateway storage.

In an alternative to step S9' and S10', once the local device becomes active, and that the requested file is available at the device, the gateway retrieves the files and sends the file to the remote device. It sends the file together with the notification to the remote device. Of course it can send the file with any other well known method for sending files. If more than one remote device requested the file, the gateway sends the file to all those remote devices.

The GUI is represented in FIGS. 4 and 5.

FIG. 4 is a screenshot representing the interfaces of the gateway. The gateway comprises a wireless interface, WLAN, and four Ethernet interfaces, ethport1 to ethport4. A local device, unknown, is connected to ethport1.

FIG. 5 is a screenshot representing information on the local device. The IP address and the interface are indicated; of course more information can be indicated, such as hardware address or UPnP information. Moreover, information on the shared files is also indicated in that screen.

According to the embodiment, the local device may be active or not active. This means that the device is power on/off or connected or not to the gateway through the network interface. Alternatively, the local device might not be connected because the gateway has disabled the interface; for example for power saving reasons. The gateway may comprise a power saving feature that for example disable the wireless interface for some periods of the day. During that period the local device is also seen as being inactive from the gateway.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A computer-implemented method at a network device, said network device comprising a processor, a first interface to a first network, a second interface to a second network, a file storage, and a routing module, for retrieval of a file shared by a first device attached to the first network, said first device comprising at least one shared file, said method comprising:
   retrieving a list of shared files stored on the first device;
   on reception by the network device of a request from a second device located on the second network for getting a shared file hosted on the first device, storing in the network device the request upon detecting the first device is not accessible;
   on detection that said first device has become accessible, retrieving the requested shared file from said first device and storing the retrieved shared file in the file storage of the network device,
   sending a notification to said second device that the shared file requested by the second device is now available at the network device,
   sending the file to the second device; and
   removing said requested shared file from said file storage after retrieving of said shared file by the second device which has requested the shared file, wherein removing the shared file from said file storage occurs after a delay, irrespective of whether the shared file has been retrieved by the second device which has requested the shared file.

2. The method according to claim 1 further comprising providing a graphical user interface for indicating the first device and the shared file.

3. A computer-implemented device connected to a first and a second network comprising:
   a hardware processor and a memory,
   a first interface to the first network, and a second interface to the second network,
   a routing means,
   a device detecting means for detecting presence of a first device on said first network,
   a file detecting means for detecting a shared file on said first device,
   a storage means for storing a request for said shared file hosted on said first device, when said first device is not accessible,
   a file storage for storing said shared file when said first device has become accessible, and
   file sharing means for managing access to said shared file locally stored in said file storage by a second device located on said second network, wherein said shared file is removed from said file storage after retrieval of said shared file by the second device, which has requested the shared file, wherein the second interface is further configured to send a notification to inform the second device that the requested shared file is now available at the computer-implemented device, wherein said processor removes the shared file from said storage module after a delay, irrespective of whether the shared file has been retrieved by the second device which has requested the shared file.

4. The device according to claim 3 further comprising a graphical user interface for indicating the first device and the shared file.

5. A computer-implemented device connected to a first and a second network comprising:
   a hardware processor and a memory,
   a first interface to the first network, and a second interface to the second network,
   a routing module,
   a device detecting module configured to detect a presence of a first device on said first network,
   a file detecting module configured to detect a shared file on said first device,
   a storage module configured to store a request for said shared file hosted on said first device, when said first device is not accessible, and to store said shared file when said first device has become accessible, and
   a file sharing module configured to manage access to said shared file locally stored in said storage module by a second device located on said second network, wherein said shared file is removed from said storage module after retrieval of said shared file by the second device, which has requested the shared file, wherein the second interface is further configured to send a notification to inform the second device that the requested shared file is now available at the computer-implemented device, wherein said processor removes the shared file from said storage module after a delay, irrespective of whether the shared file has been retrieved by the second device which has requested the shared file.

6. The device according to claim 5 further comprising a graphical user interface for indicating the first device and the shared file.

* * * * *